Nov. 26, 1940.                    O. O. RIESER                    2,223,226
                    STORAGE BATTERY AND CELL COVER THEREFOR
                         Filed April 28, 1938            2 Sheets-Sheet 1

INVENTOR
OLIVER O. RIESER.
BY
Allen & Allen
ATTORNEYS.

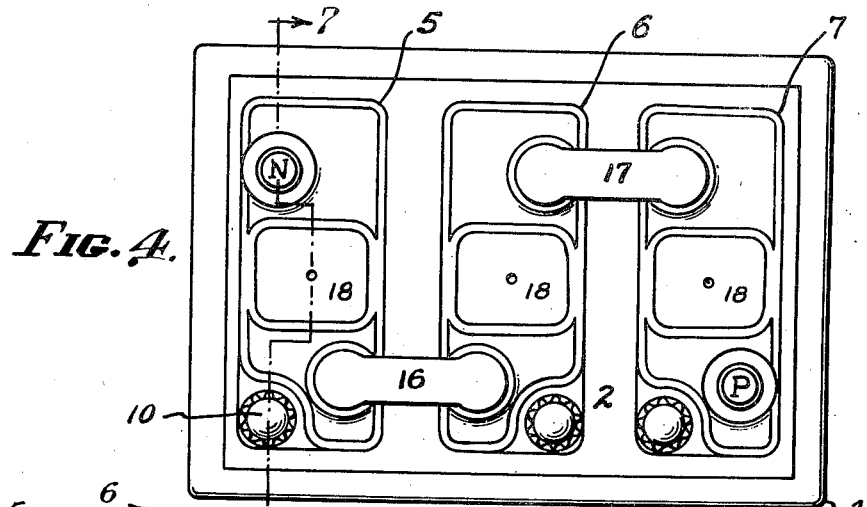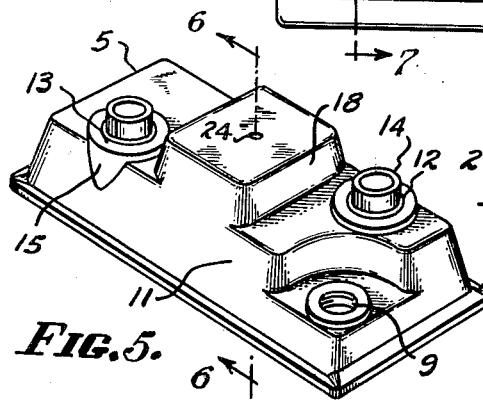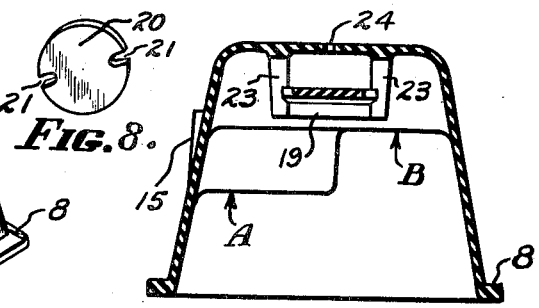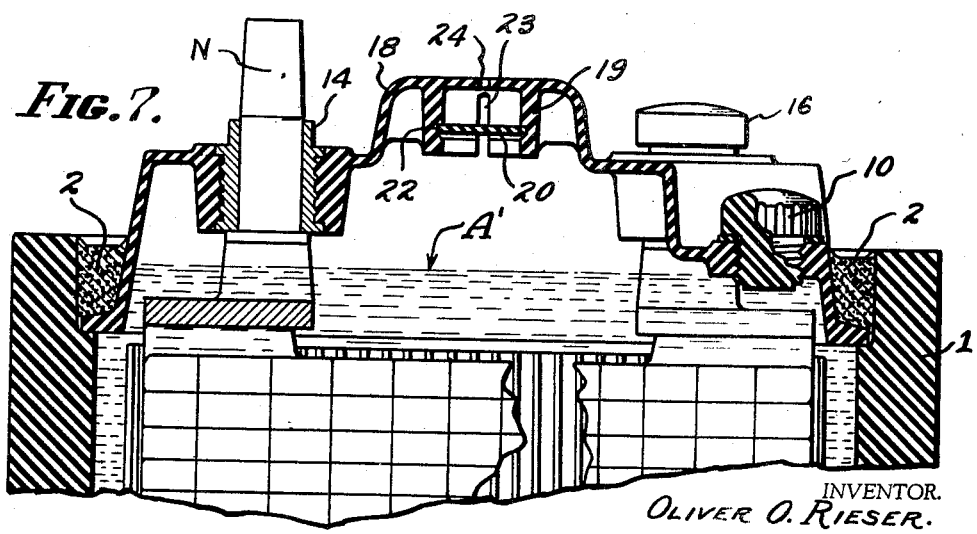

Patented Nov. 26, 1940

2,223,226

UNITED STATES PATENT OFFICE 2,223,226

STORAGE BATTERY AND CELL COVER THEREFOR

Oliver O. Rieser, Oak Park, Ill., assignor to The Richardson Company, Lockland, Ohio, a corporation of Ohio Application April 28, 1938, Serial No. 204,822

14 Claims. (Cl. 136—170)

In the use of electric storage batteries, say of the automotive type, under conditions where the batteries are subjected to rapid and extreme variations of temperature, certain serious problems arise. An example of such circumstances is where the storage battery is located beneath the hood of an automobile where it is subjected not only to external temperature conditions, but also to the heat of the engine during periods of use of the automobile. Under these conditions great variation in the apparent or effective amount of electrolyte are not only caused by direct thermal expansion, but also are caused by the action of gas. As a consequence, precautions have been suggested either to carry away any electrolyte discharged to a place where it will do no harm as by corroding adjacent metal parts, or to provide means into which the electrolyte may expand without being lost. Thus in one type of installation, the vent plugs of the several cells are provided with perforated nipples, which are vented by means of rubber hose to a place below the chassis of the automobile. In another type of installation, as set forth in the copending application of John A. Germonprez, Serial No. 139,262, the usual vent plugs are replaced by an expansion chamber means extending considerably above the general level of the top of the battery, and which must be removed when the battery is to be filled.

An object of my invention is to provide in an electric storage battery a type of cell cover which, while not altering the construction of the storage battery case nor the mode of assembly of the storage battery, will provide a very large capacity for electrolyte expansion. It is an object of my invention to provide a storage battery having this capacity for expansion, which nevertheless cannot be overfilled so as to lose the desirable effect which has been mentioned. It is again an object of my invention to provide a storage battery for use under severe conditions, the cost of manufacture of which is not substantially greater than the cost of manufacture of ordinary storage batteries. Again, it is an object of my invention to provide a cell cover for electric storage batteries which cell cover in itself provides the capacity for expansion and the means providing against overfilling, but which does not result in a battery of very much greater over-all height. It is also an object of my invention to provide a cell cover structure which may be employed substantially alternatively with other types of cell cover structures in the large scale commercial manufacture of storage batteries, some of which must be capable of withstanding severe conditions and others of which can be of the conventional form.

These and other objects of my invention which will be set forth hereinafter or will be apparent to one skilled in the art upon reading these specifications, I accomplish by that certain structure and arrangement of parts of which I shall now describe two exemplary embodiments. Reference is made to the drawings wherein:

Fig. 4 is a top plan view of an electric storage battery embodying my invention.

Fig. 5 is a perspective view of an exemplary cell cover constructed in accordance with my invention.

Fig. 6 is a sectional view of the cell cover of Fig. 5 taken along the lines 6—6 of Fig. 5.

Fig 7 is a sectional view through a cell of the storage battery taken along the lines 7—7 of Fig. 4.

Fig. 8 is a splash washer.

The usual type of cell cover is a hollow body having peripheral flanges, adapted to be placed within the side and end walls of a cell of a storage battery container and sealed in place by sealing compound, as is well known in the art. The top of the cell cover is flat. There is a central threaded perforation to receive a vent plug, and perforations located near the ends of the cell cover to permit the passage of the terminal lugs of the plate assemblies which are placed in the cell. A threaded vent plug is employed which is hollow within, which is provided with a small central perforation to permit the vented gas, and which usually has a splash washer within it, perforated or notched to permit the passage of gas while preventing splashing. Various forms of cell covers are known having various types of provisions for the passage of the terminal lugs. My invention is applicable to all of these various types. I shall describe it in connection with a cell cover in which a metallic insert is provided for the passage of other than the end terminal members of the storage battery as such. The holes for the passage of the end terminal members are provided with rubber gaskets for sealing purposes. The other terminals are, of course, burned to the metallic inserts in the cell covers and are provided with cell connector bars. Thus in the type which I shall describe, the two end cell covers of a three cell storage battery are each provided with one rubber gasket post hole and one metallic insert post hole; while the middle cell cover is provided with two metallic insert post holes. It will be within the skill of the worker in the art to adapt my invention to other types of cell covers and to types of storage batteries wherein, instead of individual cell covers, a unitary cover for all cells of the storage battery is employed.

Figure 1:
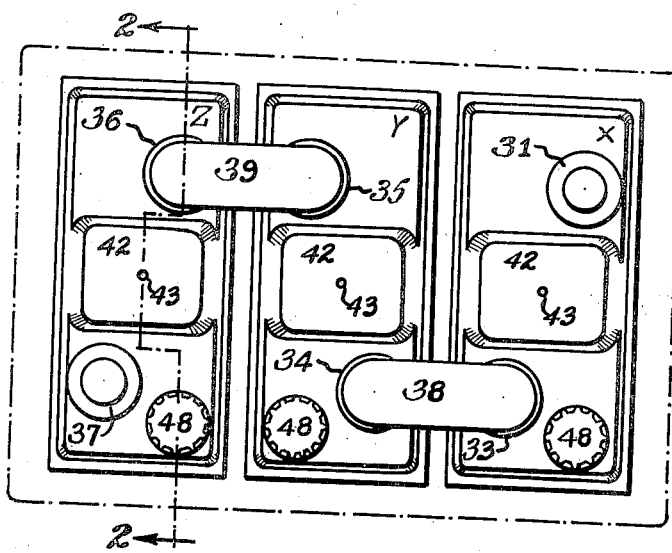
Figure 1 is a top plan view of a three cell cover assembly for a storage battery.

In Figure 1, I have shown cell covers X, Y and Z. Cell cover X is provided with a rubber gasket post hole 31 for the positive terminal of the storage battery and a metal insert post hole 33 for the other terminal of its plate assembly. The intermediate or middle cell cover is provided with metal insert post holes 34 and 35. The other end cell cover is provided with a metal insert post hole 36 and a gasket post hole 37 for the negative terminal of the storage battery. The intermediate terminals of the several plate assemblies are connected respectively by connector bars 38 and 39.

Figure 2:
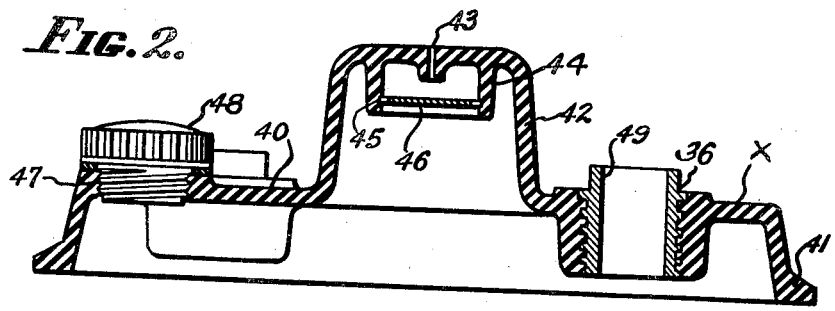
Fig. 2 is a sectional view through one of the cell covers, taken along the lines 2—2 of Fig. 1.

In Fig. 2, I have shown the cell cover X in section. Here the usual hollow body 40 is shown with peripheral flanges 41. Centrally, however, the body 40 is provided with an enlarged dome 42. The particular shape and size of this dome may be varied to suit requirements. Ordinarily the dome will have as large a horizontal area as possible, without interfering with the terminal members and connecting bars. A preferred shape for the dome is clearly shown in the drawings. The dome has a small gas vent opening 43, preferably located centrally in its top. Within the dome and about the gas vent opening 43, I provide a skirt 44 which may have an interior groove or notch 45 into which a perforated splash washer 46 may be pressed.

The filling opening 47 instead of being located in the center of the cell cover is located elsewhere and preperably in one corner. The type of vent plug which I employ is indicated at 48. It is less expensive than the ordinary vent plug in that it is not provided either with a gas vent opening or with a splash washer. It may be made smaller, and it need not, unless desired, be hollow within.

My cell cover may be molded just as ordinary cell covers are molded, and at no greater expense. As a finished article it is at least as inexpensive as the ordinary cell cover and is far less expensive than the structures heretofore proposed for use under circumstances where the storage battery is subjected to extreme variations of temperature.

Figure 3:
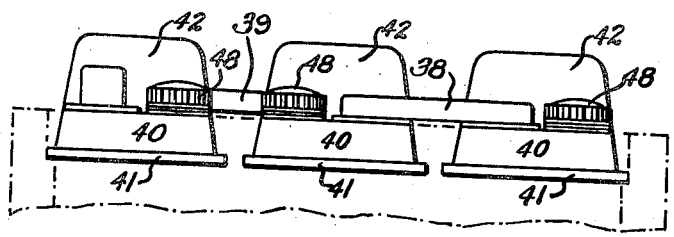
Fig. 3 is an elevational view of the assembly of Fig. 1.

In operation, the storage battery having a cell cover according to Figs. 1 to 3, is filled in the usual way through the filling opening 47. This opening is at the top level of the body 40 and is not located in or as a part of an expansion chamber, the expansion chamber lying thereabove. As a consequence, the storage battery cannot be over-filled. Because the filler cap is imperforate and because the dome is vented as at 43, the dome is able to take up the expansion of gas-laden electrolyte without discharging it from the storage battery. The capacity of the dome is very large and yet the over-all size of the storage battery is not substantially increased. In the form shown, the height of the dome is not very much greater than the height of the terminal posts of the storage battery.

The metal insert for the post hole 36 is shown at 49.

In Figs. 4 to 8 I have shown a modification of my invention.

In Fig. 4, I have indicated at 1 a storage battery box or case of the usual type having side and end walls as shown, and partition members which are not shown because they are covered with the sealing compound 2, lying between the cell covers indicated generally at 5, 6 and 7.

The cell cover 5 is illustrated in perspective in Fig. 5. It is provided with the usual flanges 8 on all sides. The body tapers as is usual in cell covers. At a point marked 9, and at a height above the flanges 8 which may be thought of as comparable to the usual height of a cell cover (but may to advantage be lower and may also be higher without departing from the spirit of my invention), I have provided a filling opening. This filling opening is threaded as is the usual practice, but may to advantage be much smaller than the usual filling opening in storage battery cell covers, since the plug 10 to be used therewith is an imperforate threaded plug and no provision need be made to vent it or to provide a splash washer. The smaller the filler opening is, the greater is the area of the remainder of the body which can be carried upwardly, as will presently be described. The filler opening 9 is conveniently located in one corner of the cell cover.

Elsewhere the body is carried upwardly as at 11 substantially beyond the height of the member 9. The body of the cell cover is of hollow construction and the carrying of it upwardly as shown, gives a large capacity for expansion of electrolyte. This is illustrated in Fig. 6 where the point A indicates the lower edge of the filling opening, whereas the point B illustrates the general level of the body. The body is provided with openings 12 and 13 for the terminal posts of plate assemblies. The particular form of these openings may be any desired. I have illustrated an opening provided with a lead bushing 14, as is frequent in storage battery construction. This, however, does not constitute a limitation upon my invention. Since the body of my cell cover is higher than usual and is preferably tapered, it may be necessary to mold the post openings 12 and 13 in partial bosses indicated at 15.

While I have illustrated a type of cell cover to be employed with electric storage batteries having terminal posts on all plate assemblies (the usual connector members 16 and 17 in Fig. 4 being employed), it will be understood that my invention is equally applicable to other types of storage batteries, by way of example, to the battery of my copending application Serial No. 204,821 filed April 28, 1938 and entitled Storage battery construction, where connection between plate assemblies of different cells is made over the partition and essentially between the cell covers. This is but one illustration of modifications which may be made in my invention. In this illustration one or more of the openings 12 or 13 for the accommodation of terminal posts may be omitted.

Centrally (and between the terminal post openings where these are employed), I carry the body of the cell cover further upwardly into a dome, as indicated at 18. This dome is preferably of sufficient depth to accommodate a depending skirt 19, located interiorly thereof, which skirt contains a splash washer 20. An exemplary form of splash washer is shown in Fig. 8, consisting of a flat disc of insulative and acid resistant material, which is usually either perforated or is notched as at 21. A groove 22 may be formed about the inside of the skirt 19 and if desired the skirt may be slotted as at 23. This gives to the skirt sufficient resiliency to permit the insertion of the washer 20, which in this event may be an imperforate, un-notched disc if desired. However, if the washer 20 is sufficiently flexible and resilient, the slots 23 may be omitted. Above the splash washer the dome 18 is provided with a small vent opening 24.

The cell cover of my invention is formed by the usual processes for the manufacture of cell covers, e. g. in a multiple mold from sheets of hard rubber composition by the usual molding process, involving vulcanization and cure. By reason of the configuration shown, the cell cover will be found to be satisfactorily strong; but it may, if desired, be reinforced by internal ribs as is sometimes the practice, providing, as is also usual, that these ribs are diagonally placed and terminate at one end on the level B. Ribs extending across interiorly of the cell cover could be employed, if desired, provided these ribs were perforated at or near the level B, so that they would not serve to divide the cell cover into non-communicating compartments, as will be readily understood.

The cell covers are preferably made in rights and lefts, as shown in Fig. 4, for the reason that this brings out the filling openings and filler plugs to one side of the storage battery, as shown. This is a matter contributing to convenience. If in the cell covers there is any difference between the terminal posts marked respectively N and P in Fig. 4, and the terminal posts for connection to the connector bars 16 and 17, this will be taken care of in the manufacture of the cell covers in more than two styles of cell covers.

The mode of assembly of a storage battery using my cell covers is similar to that ordinarily employed, and so far as the remainder of the elements of the storage battery are concerned, it is only necessary somewhat to elongate the terminal posts as will be readily understood. The plate assemblies together with separators are placed in the cells of the storage battery case 1, and the cell covers are put in position with the terminal posts extending through the perforations 12 and 13 or the metal bushings 14, as the case may be. The cell covers are then sealed in position by pouring about them the regular sealing compound 2. The intermediate terminal posts will be connected by the connector bars 16 and 17 which are burned in place. Where cell covers having metallic inserts are employed, it is usual to burn the terminal posts to these also.

In the assembled storage battery as shown in Fig. 7, while the level of the electrolyte will usually be lower, it cannot rise above the level A' which corresponds with the level A in Fig. 6. Any attempt to fill the storage battery beyond this point will result in overflow of electrolyte or water through the filling opening 9. When the filling opening is closed, however, with the imperforate plug 10 the electrolyte can expand under severe conditions of usage to fill, if necessary, the entire space inside the cell cover body without loss of electrolyte. So long as the electrolyte does not rise above the level B in Fig. 6, none of it can be lost. There is even a factor of safety permitting rise of electrolyte in the dome 18 before any of it is forced out through the vent opening 24.

Modifications may be made in my invention without departing from the spirit of it.

Having thus described my invention, what I claim as new and desire to secure by Letters Patent is:

1. A cell cover for an automobile type storage battery comprising a hollow body having a depending peripheral skirt and sealing flange and a flat top, said top provided with at least one opening for the passage of the terminal member of a storage battery plate assembly, said top being provided in one portion with a filler opening and an imperforate filler cap, said cell cover top in another portion extending upwardly beyond said filler opening to form an integral hollow projection, open to the interior of said body and of sufficient volumetric capacity to form a gas collection space above said filler opening and closed elsewhere excepting for a gas vent opening in the top of said projection, and of restricted extent with respect to the interior of said projection, the said filler opening acting to determine a maximum electrolyte level for a cell covered by said cell cover, and said gas vent opening in said hollow projection being located above said filler opening whereby to provide a vent for gases collecting above said maximum electrolyte level.

2. In a storage battery cell cover, a hollow body having a flat top, means for determining a maximum electrolyte level with respect to a gas vent opening, said means including a portion of said top having a filler opening, an imperforate filler cap for closing said filler opening, said top in a portion removed from said filler opening extending upwardly therebeyond to form an integral hollow projection of dome like character and of sufficient volume capacity to act as a gas collection space, open to the interior of said body and closed elsewhere excepting for a gas vent opening in the top of said projection, said gas vent opening being located above said maximum electrolyte level.

3. In a storage battery cell cover, a hollow body having a flat top, means for determining a maximum electrolyte level with respect to a gas vent opening, said means including a portion of said top having a filler opening, an imperforate filler cap for closing said filler opening, said top in a portion removed from said filler opening extending upwardly therebeyond to form an integral hollow projection of dome like character and of sufficient volume capacity to act as a gas vent collection space, open to the interior of said body and closed elsewhere, excepting for a gas vent opening of restricted area in the top of said projection, said projection rising bodily above the top level of said filler opening, and said gas vent opening being located above the top level of said filler opening, and constituting the sole means for the passage of gas through said cover.

4. A cell cover for an automobile type storage battery comprising a hollow body having a depending peripheral skirt and sealing flange and a flat top, said top provided with at least one opening for the passage of the terminal member of a storage battery plate assembly, said top being provided in one portion with a filler opening and an imperforate filler cap, said cell cover top in another portion extending upwardly to form an integral hollow projection of sufficient volume capacity to act as a gas collection space open to the interior of said body and closed elsewhere excepting for a gas vent opening of restricted area in the top of said projection, the said filler opening acting to determine a maximum electrolyte level for a cell covered by said cell cover, and said gas vent opening in said hollow projection being located above said filler opening whereby to provide a vent for gases collecting above said maximum electrolyte level, said filler opening being located adjacent one end of said top, and said projection being located substantially centrally of said top.

5. A cell cover for an automobile type storage battery comprising a hollow body having a depending peripheral skirt and sealing flange and a flat top, said top provided with at least one opening for the passage of the terminal member of a storage battery plate assembly, said top being provided in one portion with a filler opening and an imperforate filler cap, said cell cover top in another portion extending upwardly to form an integral hollow projection, open to the interior of said body and closed elsewhere excepting for a gas vent opening in the top of said projection, the said filler opening acting to determine a maximum electrolyte level for a cell covered by said cell cover, and said gas vent opening in said hollow projection being located above said filler opening whereby to provide a vent for gases collecting above said maximum electrolyte level, said filler opening being located adjacent one end of said top, and said projection being located substantially centrally of said top and extending substantially from side to side of said top.

6. A cell cover for an automobile type storage battery comprising a hollow body having a depending peripheral skirt and sealing flange and a flat top, said top provided with at least one opening for the passage of the terminal member of a storage battery plate assembly, said top being provided in one portion with a filler opening and an imperforate filler cap, said cell cover top in another portion extending upwardly to form an integral hollow projection, open to the interior of said body and closed elsewhere excepting for a gas vent opening in the top of said projection, the said filler opening acting to determine a maximum electrolyte level for a cell covered by said cell cover, and said gas vent opening in said hollow projection being located above said filler opening whereby to provide a vent for gases collecting above said maximum electrolyte level, said filler opening being located adjacent one end of said top, and said projection being located substantially centrally of said top and extending substantially from side to side of said top, the side edges of said projection being substantial continuations of side portions of said skirt, said projection being of substantial extent longitudinally of said top and having a depth at least equal to the depth of said body.

7. A cell cover for an automobile type storage battery comprising a hollow body having a dependent peripheral skirt and sealing flange and a flat top, said top provided with interspaced openings for the passage of the terminal members of a storage battery plate assembly, said top being provided adjacent one end with a filler opening and an imperforate filler cap, said cell cover in its central portion extending upwardly to form an integral hollow projection, open to the interior of said body and closed elsewhere excepting for a gas vent opening in the top of said projection, the said filler opening acting to determine a maximum electrolyte level for a cell covered by said cell cover, and said gas vent opening in said hollow projection being located above said filler opening, said projection extending substantially laterally from side to side of said top, and extending longitudinally of said top so as to occupy substantially the space thereof between said terminal openings and having a depth at least equal to the depth of said body.

8. A cell cover for an automobile type storage battery comprising a hollow body having a dependent peripheral skirt and sealing flange and a flat top, said top provided with interspaced openings for the passage of the terminal members of a storage battery plate assembly, said top being provided adjacent one end with a filler opening and an imperforate filler cap, said cell cover in its central portion extending upwardly to form an integral hollow projection, open to the interior of said body and closed elsewhere excepting for a gas vent opening in the top of said projection, the said filler opening acting to determine a maximum electrolyte level for a cell covered by said cell cover, and said gas vent opening in said hollow projection being located above said filler opening, said projection extending substantially laterally from side to side of said top, and extending longitudinally of said top so as to occupy substantially the space thereof between said terminal openings and having a depth at least equal to the depth of said body, a depending skirt within said projection and about said gas vent opening, and a splash washer held in said depending skirt.

9. A cell cover for storage batteries comprising a hollow body, a peripheral flange on said body, said body rising as a whole to a general level above said flange to provide a substantial volume into which electrolyte may expand, a filling opening having a mouth depressed below the general level, an imperforate closure for said opening and an integral domed portion of said cover extending above said general level and having a vent opening at substantially its highest part.

10. In an electric storage battery a container having a plurality of cells, plate assemblies in said cells, cell covers in the tops of said cells, sealing compound located about the peripheries of said covers and holding them in place, each of said cell covers comprising a body rising as a whole to a general level above said flange to provide a substantial volume into which electrolyte may expand, a filling opening having a mouth depressed below the general level, an imperforate closure for said opening and an integral domed portion of said cover extending above said general level and having a vent opening at substantially its highest part.

11. In an electric storage battery a container having a plurality of cells, plate assemblies in said cells, cell covers in the tops of said cells, sealing compound located about the peripheries of said covers and holding them in place, each of said cell covers comprising a body rising as a whole to a general level above said flange to provide a substantial volume into which electrolyte may expand, a filling opening having a mouth depressed below the general level, an imperforate closure for said opening and an integral domed portion of said cover extending above said general level and having a vent opening at substantially its highest part, said cell cover bodies having perforations for the passage of terminal posts of plate assemblies in said cells.

12. In an electric storage battery a container having a plurality of cells, plate assemblies in said cells, cell covers in the tops of said cells, sealing compound located about the peripheries of said covers and holding them in place, each of said cell covers comprising a body rising as a whole to a general level above said flange to provide a substantial volume into which electrolyte may expand, a filling opening having a mouth depressed below the general level, an imperforate closure for said opening and an integral domed portion of said cover extending above said general level and having a vent opening at substantially its highest part, said cell cover bodies having perforations for the passage of terminal posts of plate assemblies in said cells and splash washers located below said vent openings to prevent loss of electrolyte by splashing.

13. In a storage battery cell cover a hollow integral body having peripheral flanges and characterized by a plurality of different levels as to the top portion thereof, the lowest of said levels being provided with a filler opening having tight closure means, another of said levels marking the general height of the top of said cell cover, and a third level formed in a portion extending upwardly therefrom and being provided with a vent opening, said third level constituting a portion of said cell cover forming a dome.

14. In a storage battery cell cover a hollow integral body having peripheral flanges and characterized by a plurality of different levels as to the top portion thereof, a lower one of said levels being provided with a filler opening having tight closure means, another of said levels marking the general height of the top of said cell cover, and a third level extending upwardly therefrom and being provided with a vent opening, said last mentioned portion of said cell cover forming a dome, a depending skirt within said dome and a splash washer held within said skirt, said vent opening being above said splash washer.

OLIVER O. RIESER.